United States Patent [19]
Moore et al.

[11] Patent Number: 5,377,777
[45] Date of Patent: Jan. 3, 1995

[54] APPARATUS AND METHOD FOR SIGNALLING COINCIDENT MACHINE CONDITIONS

[75] Inventors: Byron R. Moore; Michael G. Nahorny, both of Burlington, Iowa

[73] Assignee: Case Corporation, Racine, Wis.

[21] Appl. No.: 170,823

[22] Filed: Dec. 21, 1993

[51] Int. Cl.⁶ .............................................. B60Q 5/00
[52] U.S. Cl. .................................. 180/272; 180/331; 180/330; 340/456; 340/457
[58] Field of Search ............... 180/272, 273, 271, 331, 180/330, 326, 329; 340/456, 457

[56] References Cited

U.S. PATENT DOCUMENTS

| | | | |
|---|---|---|---|
| 3,544,961 | 12/1970 | Pasley et al. | 340/457 |
| 3,642,088 | 2/1972 | Smith | 180/331 |
| 4,480,867 | 11/1984 | Ezell et al. | 180/330 |
| 4,482,885 | 11/1984 | Mochida | 340/457 |
| 4,699,561 | 10/1987 | Tee | 180/273 |
| 4,934,462 | 6/1990 | Tatara et al. | 180/331 |
| 5,015,991 | 5/1991 | Barr | 340/456 |
| 5,109,945 | 5/1992 | Koga | 180/273 |

FOREIGN PATENT DOCUMENTS

| | | | |
|---|---|---|---|
| 0178238 | 8/1986 | Japan | 180/272 |
| 1192699 | 8/1989 | Japan | 180/272 |
| 0003569 | 1/1990 | Japan | 180/272 |

*Primary Examiner*—Kenneth R. Rice
*Assistant Examiner*—Peter C. English
*Attorney, Agent, or Firm*—Jansson & Shupe, Ltd.

[57] ABSTRACT

The disclosure involves an apparatus for detecting coincidence of (a) a vehicle transmission engaged in the power mode and (b) the operator's seat in a "first" position, i.e., a position other than that from which the vehicle is normally driven. Such apparatus has an annunciator, a first circuit providing a first conductive path when the seat is in the first position and a second circuit providing a second conductive path when the transmission is engaged in the power mode, forward or reverse. When, coincidently, the seat is in such position and the transmission is in the power mode, the first and second circuits coact to energize the annunciator and alert the vehicle operator.

13 Claims, 4 Drawing Sheets

APPARATUS AND METHOD FOR SIGNALLING COINCIDENT MACHINE CONDITIONS

FIELD OF THE INVENTION

This invention relates generally to vehicles and, more particularly, to material handling vehicles.

BACKGROUND OF THE INVENTION

The term "vehicle" usually conjures up a mental image of a machine, the primary purpose of which is to transport goods and/or people from place to place. However, there are certain types of vehicles configured. to perform a task in a relatively localized area with the vehicle transportation capability being rather ancillary to the vehicle's main purpose.

A vehicle of the latter type is a construction/digging machine known as a backhoe. A primary purpose of a backhoe is to excavate and move earth rather than to transport goods or people. Such a machine is not unlike a farm tractor in general appearance and in the fact that the operator faces forward to drive the machine. However, a backhoe differs from such a tractor by virtue of the type of implement with which it is equipped.

At its rear, a backhoe is equipped with a digging implement comprising a hydraulically-operated articulated boom to which is attached a digging bucket. The boom and bucket are not unlike a human arm (the "boom") and hand (the "bucket"). Digging is with the "fingers," i.e., the bucket teeth, pointing generally downward. The boom can be swung in an arc to, say, deposit earth on a spoil pile after it has been excavated. A backhoe may also have a front-mounted loading bucket in which instance the machine is referred to as a loader backhoe.

A common type of backhoe has an operator's seat which, when facing forward, gives the operator access to those controls, e.g., steering wheel, throttle, brakes and the like, used to transport the machine from place to place. When the seat is pivoted to face rearward (about 180° from the forward-facing position), the operator has access to the hydraulic valve levers used to set the machine outriggers for stability and to operate the implement. Backhoes are commonly seen digging trenches for pipelines although backhoes can be (and are) used to perform many other digging tasks.

A way of describing a backhoe is that it has two "systems," namely, the implement system and the machine transport drive system. Such systems are susceptible to simultaneous operation. But since the operator faces in different directions, usually about 180° apart, to perform such operations, the possibility of such simultaneous operation gives rise to certain concerns.

That is, after the operator has properly positioned the machine using the drive system (and while anticipating the digging task to be performed later), s/he may inadvertently try to use the implement to dig while leaving the controls in the drive or power mode. (It should be noted that such an error would not be made by an operator who is even minimally attentive.)

Persons in the field of machine design have recognized somewhat similar possibilities with other types of industrial machines. For example, U.S. Pat. No. 5,109,945 (Koga) involves a system used on an industrial fork lift truck. While such system detects when the truck operator leaves the seat, no operator signal is annunciated. And, of course, the Koga system is not suitable for use in applications where the operator does not leave the seat when performing any of plural tasks.

An apparatus and method which signals a vehicle operator when, coincidently, the vehicle transmission is in the power mode and the seat is pivoted away from the controls used to transport the machine would be an important advance in the art.

OBJECTS OF THE INVENTION

It is an object of the invention to provide an improved apparatus and method overcoming some of the problems and shortcomings of the prior art.

Another object of the invention is to provide an improved apparatus and method for signalling when a vehicle transmission is in the power mode and, simultaneously, the operator's seat is in a particular position or range of positions.

Yet another object of the invention is to provide an improved apparatus and method for providing an audible signal to a vehicle operator upon the occurrence of such a condition.

Still another object of the invention is to provide an improved apparatus and method for use with backhoes. How these and other objects are accomplished will become more apparent from the following descriptions and from the drawing.

SUMMARY OF THE INVENTION

The invention is particularly suited for use with backhoes of the type described above. In a backhoe, the machine operator's seat is mounted for movement between two positions. The first position may be described in terms of the second, i.e., the first being that where the seat is pivoted away from the second position. And the latter, second position is the seat position from which the operator drives the machine.

As described in greater detail below, the seat is said to be in the first position when a seat center axis is anywhere within a circle arc of, e.g., 330° or so. The seat is said to be in the second position when its center axis is anywhere within the remaining "forward-facing" 30° or so of the circle.

The invention involves an apparatus having both electrical and mechanical aspects. Such apparatus, for detecting and signalling coincidence of transmission power mode and seat first position, includes an annunciator for signalling the machine operator that such coincidence exists.

The apparatus has a first circuit providing a first conductive path when the seat is in the first position and a second circuit providing a second conductive path when the transmission is in the power mode. When, coincidently, the seat is in the first position and the transmission is in the power mode, the first and second circuits coact to energize the annunciator and signal the operator.

The first circuit includes a seat switch which "changes state" when the seat is moved between the first position and the second position. (The phrase "change-of-state," well understood in the electrical arts, means changing from an open to a closed position or from a closed to an open position. The phrase is apt, irrespective of whether the device under discussion is mechanical, electromechanical or solid state in configuration.)

More specifically, in one type of machine, the seat is mounted for pivoting circular movement and may be said to have a center axis extending fore and aft. The machine may be said to have a reference axis which is stationary with respect to the machine frame. The seat is in the first position, i.e., away from the machine driving position and at or pivoting toward the implement operating position, when the included angle between the center axis and the forward-pointing reference axis is greater than a predetermined angle, e.g., 15°–20° or so.

The contacts of a seat switch change state whenever the operator pivots the seat between its first and second positions. Such contacts are used in the apparatus for alerting the operator if the seat is pivoted away from the driving position while the transmission is engaged for forward or reverse power.

The second circuit includes a transmission switch which changes state when the operator shifts the transmission between the neutral mode and the power mode. In one highly preferred arrangement, the transmission switch is embodied as a pressure switch which is open when the transmission is in neutral and closes whenever such transmission is shifted into the power mode, i.e., forward or reverse. Alternatively, two pressure switches may be used, one being closed when the transmission is in forward or reverse, respectively. In another highly preferred arrangement, the transmission switch is embodied as an operator-manipulated shuttle switch.

In other aspects of the invention, the apparatus includes an alarm relay, the contacts of which are connected between the annunciator and the first circuit. The second circuit includes a transmission relay, the contacts of which change state when the transmission is shifted between the power mode and the neutral mode.

In one embodiment, the seat switch, connected in the first circuit, is closed when the seat is in the first position and the contacts of the alarm relay are closed when the transmission is in the power mode. Since the seat switch and the contacts of the alarm relay are in series with the annunciator, the annunciator is energized when the seat is in the first position and the transmission is in the power mode.

In another embodiment, the second circuit includes an operator-manipulated shuttle switch, contacts of which change state when the transmission is shifted between the power mode and the neutral mode. The shuttle switch energizes the alarm relay when the transmission is in the power mode and, since the seat switch and the contacts of the alarm relay are in series with the annunciator, the annunciator is energized when the seat is in the first position and the transmission is in the power mode.

Yet other aspects of the invention involve a method for detecting coincidence of (a) the transmission in the power mode and (b) the seat in the first position. The method includes, in either order or simultaneously, the steps of establishing a first conductive path when the seat is in the first position and establishing a second conductive path when the transmission is in the power mode. Such method also includes the step of annunciating a signal when the conductive paths are established simultaneously.

In more detailed aspects, the step establishing a first conductive path includes actuating a seat switch and the step establishing a second conductive path includes actuating a transmission switch. Preferably, the step establishing a second conductive path also includes actuating a transmission relay.

In one preferred version of the method, the seat switch is of the type having contacts closed when the seat is in the first position. Transmission relay actuating includes closing contacts in series with the annunciator and the seat switch. Electrical power thereby flows through the seat switch, the closed contacts and the annunciator and the operator is alerted that the transmission is in the power mode and the seat is out of its second or "machine-driving" position.

Other aspects of the invention are set forth in the following detailed description and in the drawing.

DETAILED DESCRIPTION OF PREFERRED EMBODIMENTS

Figure 1:
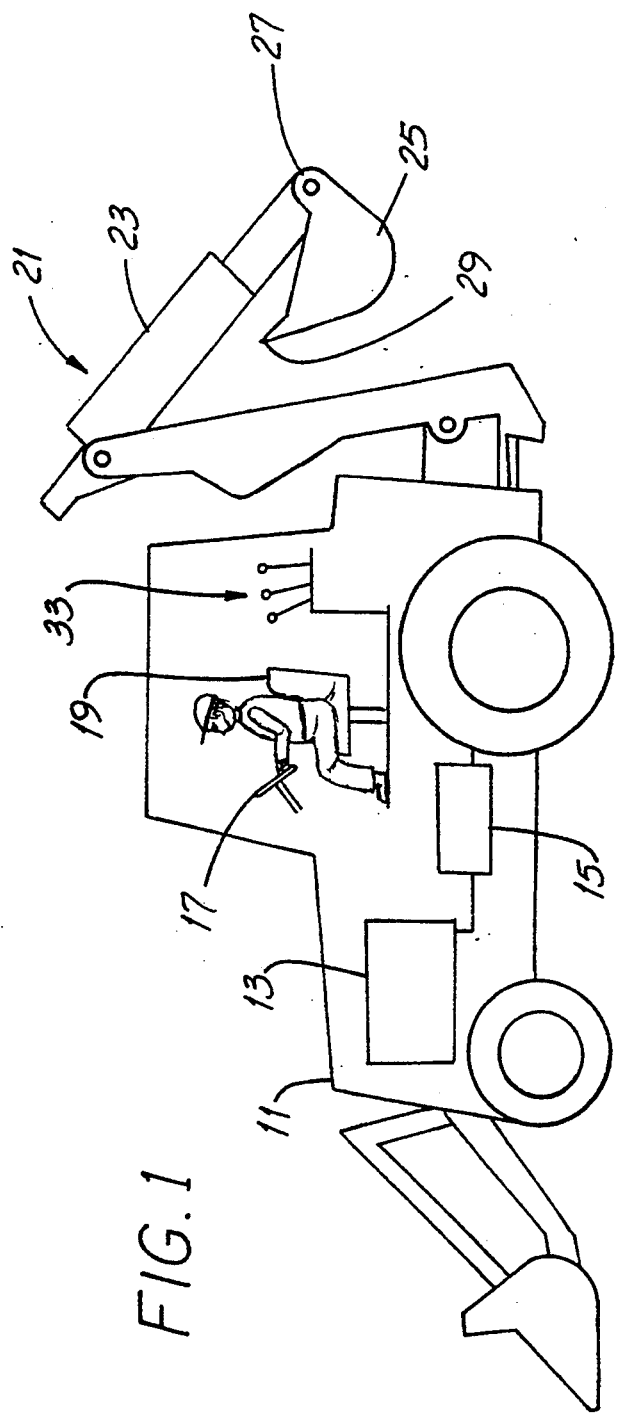
FIG. 1 is a representative side elevation view of a backhoe, a type of motorized vehicle used for digging.

Before describing the inventive apparatus 10 and method, it will be helpful to have a general understanding of a type of machine for which the invention is particularly useful. FIG. 1 illustrates a backhoe 11 having an engine 13, a transmission 15 (preferably of the torque converter type), a steering wheel 17 and an operator's seat 19. At its rear, the backhoe 11 has a digging implement 21 comprising a hydraulically-operated articulated boom 23 to which is attached a digging bucket 25.

When urged downward and into the earth by the boom 23 and, usually, by a hydraulic cylinder at the "wrist 27," the bucket teeth 29 bite into the earth and the bucket 25 fills. When the bucket 25 is filled, the boom 23 is pivoted left or right and the bucket 25 emptied by pivoting it counterclockwise (as shown in FIG. 1) about the wrist 27.

Figure 4:
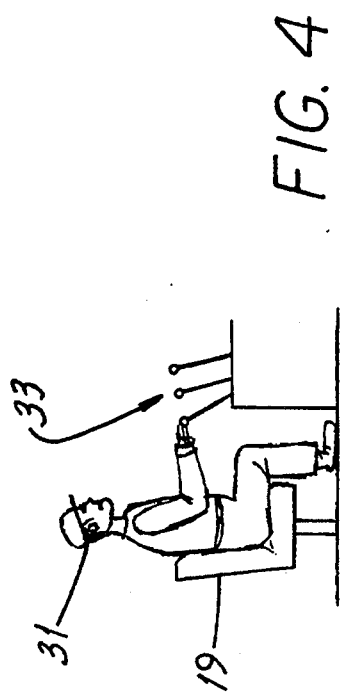
FIG. 4 is a representative side elevation view showing the rearward-facing operator's seat and control levers used to manipulate the backhoe implement.
Figure 2:
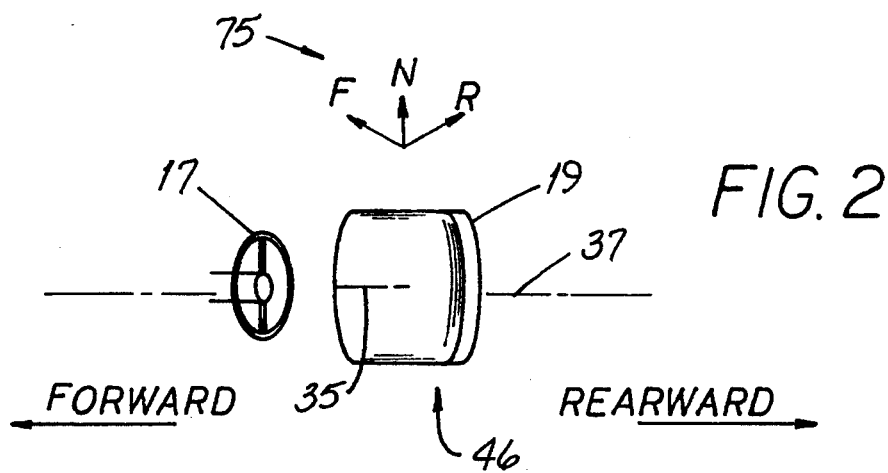
FIG. 2 is a representative top plan view of the backhoe steering wheel, the forward-facing operator's seat and the transmission forward/neutral/reverse selector switch.
Figure 3:
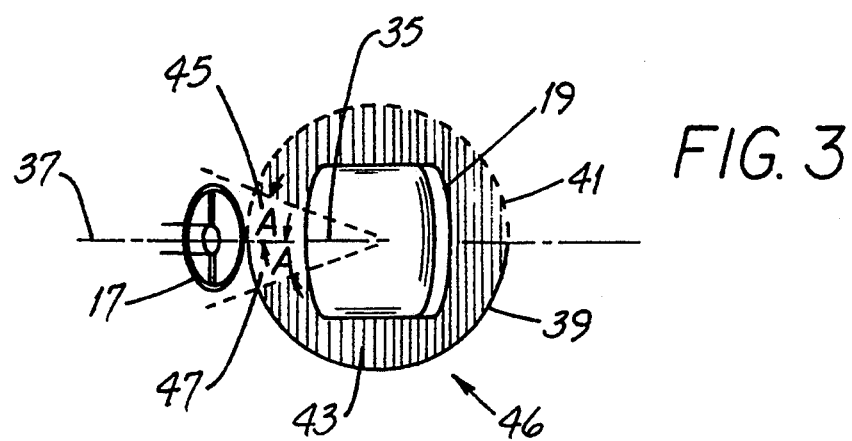
FIG. 3 is a representative top plan view like that of FIG. 2 and showing seat first and second positions in graphic form.
Figure 5:
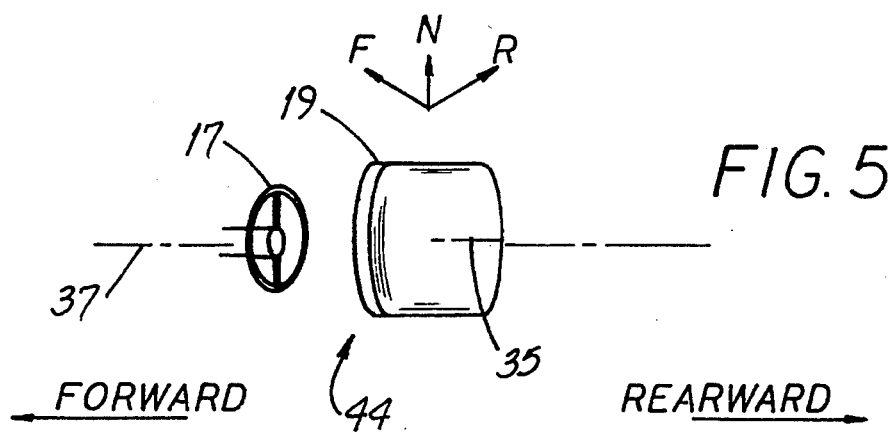
FIG. 5 is a representative top plan view of the backhoe steering wheel, the rearward-facing operator's seat and the transmission forward/neutral/reverse selector switch.

When the seat 19 faces forward as shown in FIGS. 1, 2 and 3, the operator 31 has access to those controls, e.g., the steering wheel 17, used to transport the machine from place to place. When the seat 19 is pivoted to face rearward as shown in FIGS. 4 and 5 (about 180° from the forward-facing position), the operator 31 has access to the hydraulic valve levers 33 used to set the machine outriggers for stability and to operate the implement.

Before describing aspects of the invention, it will also be helpful to provide a brief explanation of some of the terminology used in this specification. Referring particularly to FIGS. 2, 3 and 5, it is assumed that the seat 19 has a horizontal center axis 35. Such axis 35 extends fore and aft when the seat 19 is facing directly forward or directly rearward. It is also assumed the backhoe 11 has a central longitudinal reference axis 37 which is stationary with respect to the backhoe per se.

By either of the half-circles 39, 41 (one half-circle 39 in solid line, one half-circle 41 in dashed line) FIG. 3 illustrates that the seat 19 is capable of 180° pivoting movement. On the other hand, a seat 19 may be capable of 360° pivoting movement, either (a) a single revolution in one direction before being required to be revolved in the opposite direction, (b) multiple revolutions only in one direction or (c) multiple revolutions in either direction.

In any of the foregoing instances, when the horizontal seat axis 35 is in registry with that portion 43 of the circle which is shaded, the seat 19 is said to be in the "first seat position 44." When such axis 35 is in registry with a non-shaded portion 45 or 47, the seat 19 is said to be in the "second seat position 46."

And there is another way to describe the first seat position, i.e., in terms of the second position. That is, the first position is that where the seat 19 is pivoted away from the second position. And the latter, second position is the seat position from which the operator 31 drives the machine.

Figure 6:
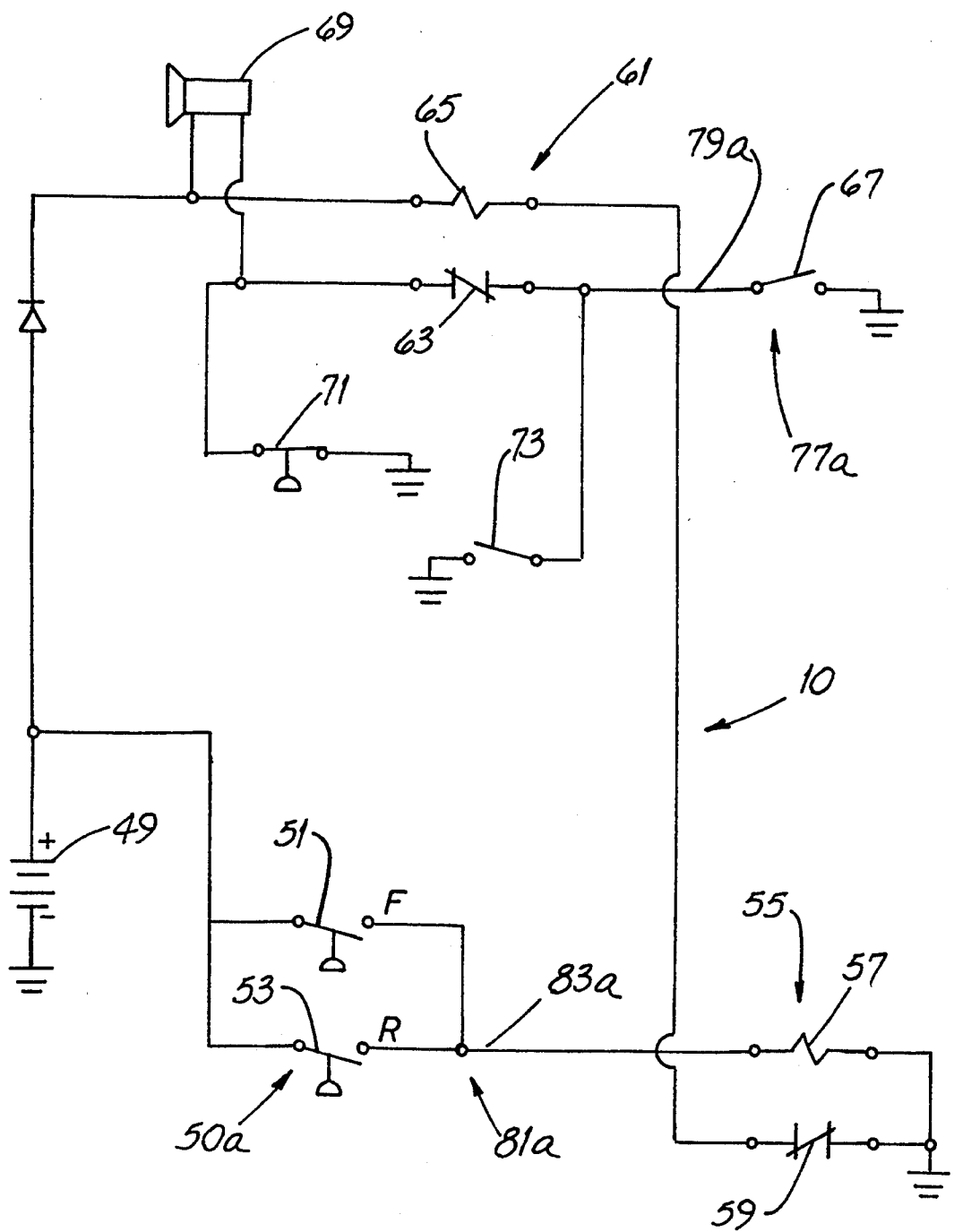
FIG. 6 is a diagram of a first embodiment of the inventive circuit apparatus.

Referring now to the circuit of FIG. 6 illustrating the first embodiment of the apparatus 10, certain of the apparatus components will be identified. The operation of such circuit will then be described.

The circuit includes a battery 49 or other source of DC power and two pressure switches 51, 53 in parallel. The switch 51 or 53 is closed when the transmission 15 is in the power mode in the forward or reverse direction, respectively. A normally-closed transmission relay 55 includes a coil 57 and a contact 59 closed when the coil 57 is de-energized.

(This specification makes reference to components which are "normally" open or "normally" closed. Such normal state is when the component is in the quiescent state and not influenced by external "events," e.g., electrical energization or the application of oil pressure.)

The circuit also has a normally-closed alarm relay 61, the contact 63 of which is closed when the relay coil 65 is de-energized. The relay contact 63 is in series with a two-position seat position switch 67 which is closed when the seat 19 is in the first position and open (as illustrated) when the seat 19 is in the second position. An annunciator 69, e.g., a horn is connected in the circuit. While an audible annunciator 69 is preferred, the term "annunciator" used herein means an audible, visual or tactile signalling device.

Preferably, the circuit also has a normally-closed oil pressure switch 71 opened by engine lube oil pressure. If such pressure declines to a level at which the engine 13 may be damaged, the switch 71 closes. There is also a parking brake switch 73 which is closed when the parking brake is set.

In operation, it is assumed that the transmission 15 is in the power mode in either the forward or reverse direction (as shown in the switch symbol 75 in FIG. 2) so that pressure switch 51 or 53 (either of which is aptly described as a transmission switch 50a) is closed. Closure of such switch 51 or 53 energizes the coil 57 and opens the contact 59, making it impossible to energize the coil 65 of the alarm relay 61 which is in series with such contact 59. As a consequence, the contact 63 of the alarm relay 61 remains closed.

If the seat 19 is in the second position facing forward (or generally so) in position for the operator 31 to drive the backhoe 11, the seat switch 67 is open and the annunciator 69 is not energized. On the other hand, if the seat 19 is in the first position, i.e., rotated slightly away from directly forward facing (and therefore facing angularly or rearward), the switch 67 is closed. The annunciator 69 is energized by power flowing from the battery 49 through the annunciator 69, the contact 63 and the switch 67 to ground. The apparatus 10 thus signals coincidence of transmission power mode and seat first position.

Considered in another way, the apparatus 10 has a first circuit 77a providing a first conductive path 79a when the seat 19 is in the first position and a second circuit 81a providing a second conductive path 83a when the transmission 15 is in the power mode. The first circuit 77a includes the seat switch 67 and the second circuit 81a includes the transmission relay 55.

Figure 7:
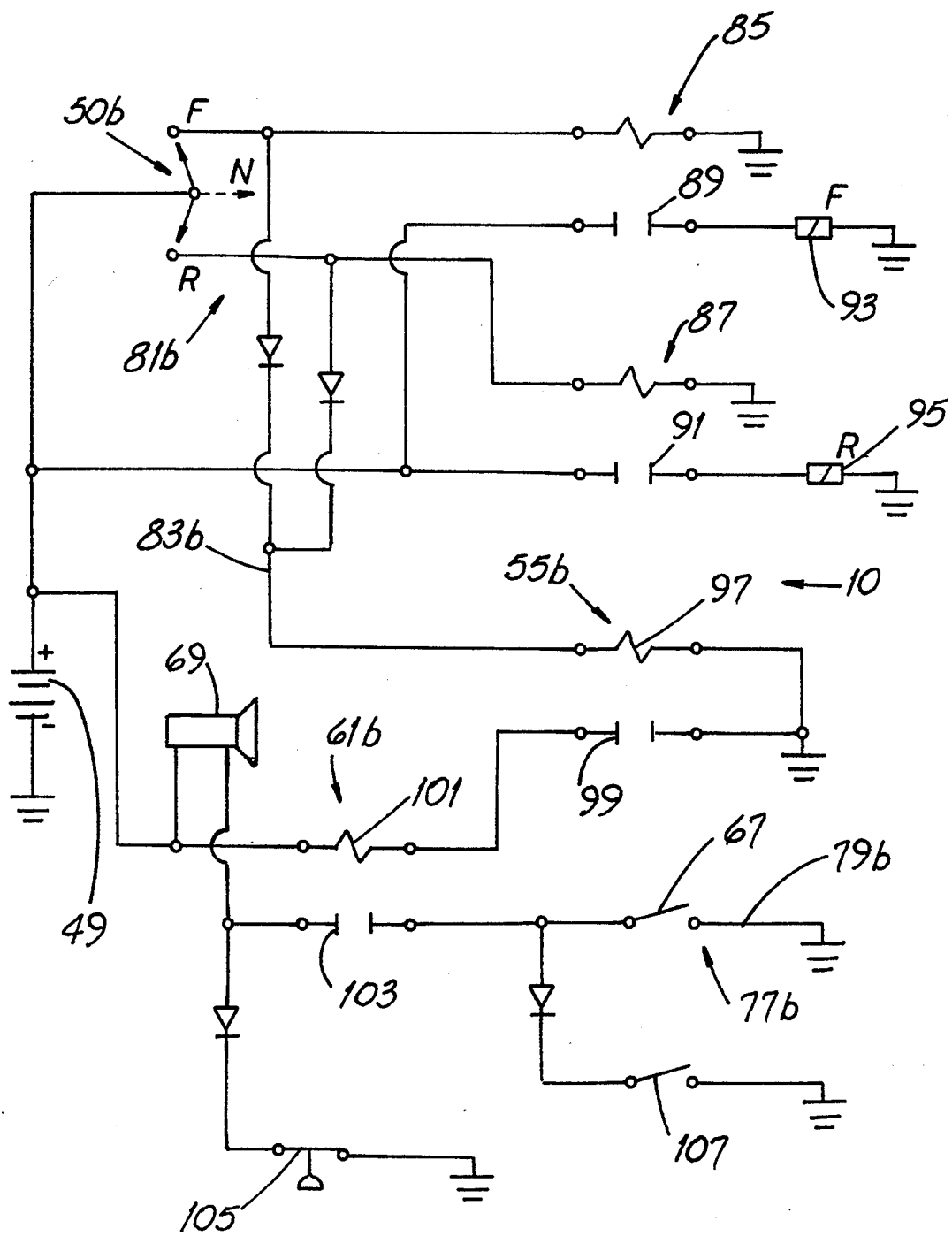
FIG. 7 is a diagram of a second embodiment of the inventive circuit apparatus.

FIG. 7 shows another embodiment of the apparatus 10 which, like that of FIG. 6, has an alarm relay 61b, a transmission relay 55b, a seat position switch 67 and an annunciator 69. Such apparatus 10 also has a forward relay 85 a reverse relay 87. Each of the relays 85 and 87 has a contact 89, 91, respectively, to energize a respective solenoid 93 or 95, energization of which puts the transmission 15 into forward or reverse drive, respectively.

Such circuit also has a transmission switch 50b which differs from the pressure switches 51, 53 (either being denominated as a transmission switch 50a) shown in FIG. 6 in that such switch 50b is a three-position, manually operated shuttle switch manipulated by the operator 31. When the switch 50b is in the neutral position as shown in dashed line, neither of the relays 85, 87 is energized and the transmission is in neutral.

When the switch 50b is moved upward or downward (as shown in solid line), either the relay 85 or the relay 87 is energized and the transmission 15 is shifted into forward or reverse, respectively. (It is to be appreciated that if the switch 50b is sized to carry and switch the operating current of the solenoids 93, 95, such switch 50b can be connected directly to such solenoids 93, 95; there would be no need for the intervening relays 85, 87.)

Like the circuit of FIG. 6, that of FIG. 7 includes a first circuit 77b providing a first conductive path 79b. There is also a second circuit 81b providing a second conductive path 83b.

In operation, it is assumed that the shuttle-type transmission switch 50b is either up or down and that the transmission is in either forward or reverse power mode, respectively. For either position of such switch 50b, the coil 97 of the normally-open transmission relay 55b is energized and its contact 99 closed.

Closure of the contact 99 energizes the coil 101 of the normally-open alarm relay 61b and its contact 103 also closes. If the seat 19 is in the second position (facing forward) in position for the operator 31 to drive the backhoe 11, the seat switch 67 is open and the annunciator 69 is not energized.

On the other hand, if the seat 19 is in the first position, i.e., rotated slightly away from directly forward facing, the switch 67 is closed. The annunciator 69 is energized by power flowing from the battery 49 through the annunciator 69, the contact 103 and the switch 67 to ground. The apparatus 10 thus signals coincidence of transmission power mode and seat first position. An oil pressure switch 105 and a parking brake switch 107 may also be included.

The inventive method includes, in either order or simultaneously, the steps of establishing a first conductive path 79 when the seat 19 is in the first position and establishing a second conductive path 83 when the transmission is in the power mode. Such method also includes the step of annunciating a signal when the conductive paths 79, 83 are established simultaneously.

In more detailed aspects, the step establishing a first conductive path 79 includes actuating a seat switch 67 and the step establishing a second conductive path 83 includes actuating a transmission switch 50. Preferably, the step establishing a second conductive path 83 also includes actuating a transmission relay 55.

In one preferred version of the method, the seat switch 67 is of the type having contacts closed when the seat 19 is in the first position. Transmission relay actuating includes closing a contact in series with the annunciator 69 and the seat switch 67. Electrical power thereby flows through the seat switch 67, the closed contact and the annunciator 69 and the operator 31 is alerted that the transmission 15 is in the power mode and the seat 19 is out of its second or "machine-driving" position.

So that the apparatus 10 is not inordinately "touchy," it is preferred that the axis 35 of the seat 19 be required to be angularly, rotationally displaced from the reference axis 37 by at least a few degrees before the seat switch 67 is actuated. As shown in FIG. 3, such angular displacement is represented by angle "A" and a value of "A" of about 15° to 20° is preferred.

While the principles of the invention are described in connection with specific embodiments, it should be understood clearly that such embodiments are exemplary and not limiting.

We claim:

1. In a material handling machine having a transmission with power and neutral modes and a seat mounted for rotational movement between a first position and a second position, an apparatus for annunciating coincidence of transmission power mode and seat first position and including:
    a source of electrical power;
    an annunciator connected to the source;
    an alarm relay having a coil connected to the source and an alarm relay contact connected to the annunciator;
    a first circuit including a seat switch which (a) is operated by rotational movement of the seat, (b) is connected to the alarm relay contact and (c) closes to provide a first conductive path between the alarm relay contact and circuit around when the seat is rotated to the first position;
    a transmission relay having a coil and a transmission relay contact which is closed when the machine transmission is in the power mode and which is connected to the coil of the alarm relay;
    a second circuit connected to the source and to the coil of the transmission relay, the second circuit including a transmission switch closed when the transmission is in the power mode; the second circuit providing a second conductive path from the source through the transmission switch to the coil of the transmission relay when the transmission is in the power mode; and wherein:
    when, coincidently, the seat is in the first position and the transmission is in the power mode, the transmission relay contact is closed, the alarm relay coil is energized through the transmission relay contact, the alarm relay contact is closed and electrical power flows from the source through:
    a) the first conductive path;
    b) the second conductive path; and
    c) the coil of the alarm relay and through the transmission relay contact, whereby the annunciator is energized.

2. The apparatus of claim 1 wherein:
    the seat has a center axis;
    the machine has a reference axis stationary with respect to the center axis; and
    the seat is in the first position when the included angle between the center axis and the reference axis is greater than about 20°.

3. The apparatus of claim 1 wherein the transmission switch receives electrical power from the source and changes state when the transmission is shifted between the neutral mode and the power mode.

4. The apparatus of claim 3 wherein the transmission switch is embodied as a pressure switch.

5. The apparatus of claim 3 wherein the transmission switch is embodied as an operator-manipulated shuttle switch.

6. The apparatus of claim 1 wherein:
    the contact of the transmission relay changes state when the transmission is shifted between the power mode and the neutral mode.

7. The apparatus of claim 6 wherein:
    the transmission switch includes a shuttle switch, a contact of which changes state when the transmission is shifted between the power mode and the neutral mode.

8. The apparatus of claim 7 wherein:
    the shuttle switch is connected between the source and the coil of the alarm relay and energizes the alarm relay coil when the transmission is in the power mode.

9. In an implement-equipped machine having (a) a transmission with power and neutral modes, (b) a seat mounted for rotational movement between a first implement-operating position and a second position, (c) a seat switch operated by rotational movement of the seat, (d) an alarm relay having a coil and an alarm relay contact, and (e) a transmission switch connected to the coil of a transmission relay when the transmission is in the power mode, a method for annunciating coincidence of (a) the transmission in the power mode and (b) the seat in the first position and including the steps of:
    establishing a first conductive path through the seat switch and the alarm relay contact when the seat is rotated to be in the first position;
    establishing a second conductive path through the transmission switch and the coil of the transmission relay when the transmission is in the power mode; and
    annunciating a signal when the first and second conductive paths are established simultaneously.

10. The method of claim 9 wherein:
    the step establishing a first conductive path includes closing the seat switch; and
    the step establishing a second conductive path includes closing the transmission switch.

11. The method of claim 9 wherein the step of establishing a first conductive path includes:
    actuating the seat switch,
and wherein the step of establishing a second conductive path includes:
    actuating the transmission switch; and actuating the transmission relay.

12. The method of claim 11 wherein the step of actuating the transmission relay includes changing the state of a transmission relay contact in series with the coil of the alarm relay.

13. In a material handling machine having a transmission with power and neutral modes and a seat mounted for rotational movement between a first position and a second position, an apparatus for annunciating coincidence of transmission power mode and seat first position and including:
- a source of electrical power;
- an annunciator connected to the source;
- an alarm relay having a coil connected to the source and an alarm relay contact connected to the annunciator;
- a first circuit including a seat switch which (a) is operated by rotational movement of the seat, (b) is connected to the alarm relay contact and (c) closes to provide a first conductive path between the alarm relay contact and circuit ground when the seat is rotated to the first position;
- a transmission relay having a coil and a transmission relay contact which is open when the machine transmission is in the power mode and which is connected to the coil of the alarm relay;
- a second circuit connected to the source and to the coil of the transmission relay, the second circuit including a transmission switch closed when the transmission is in the power mode; the second circuit providing a second conductive path from the source through the transmission switch to the coil of the transmission relay when the transmission is in the power mode;

and wherein:
when, coincidently, the seat is in the first position and the transmission is in the power mode, the transmission relay contact is open, the alarm relay coil is de-energized by the open transmission relay contact, the alarm relay contact is closed and electrical power flows from the source through:
a) the first conductive path;
b) the second conductive path; and
c) the annunciator.

* * * * *